United States Patent [19]
Kimura et al.

[11] Patent Number: 5,846,163
[45] Date of Patent: Dec. 8, 1998

[54] SHIFT CONTROL APPARATUS IN VEHICLE AUTOMATIC TRANSMISSION

[75] Inventors: Fuyumi Kimura, Chiryu; Yutaka Ito, Nagoya; Nobuyuki Okada, Anjo; Hiroyuki Nishizawa, Tajimi, all of Japan

[73] Assignee: Aisin Seiki Kabushiki Kaisha, Kariya, Japan

[21] Appl. No.: 828,542

[22] Filed: Mar. 31, 1997

[30] Foreign Application Priority Data

Mar. 29, 1996 [JP] Japan .................................. 8-076416

[51] Int. Cl.$^6$ .................................................. F16H 61/08
[52] U.S. Cl. .......................... 477/148; 477/143; 477/149
[58] Field of Search ..................... 477/61, 143, 148–149, 477/155, 154, 156

[56] References Cited

U.S. PATENT DOCUMENTS

| | | | |
|---|---|---|---|
| 5,063,814 | 11/1991 | Baba et al. ........................... | 477/154 X |
| 5,119,697 | 6/1992 | Vukovich et al. ...................... | 477/155 |
| 5,393,279 | 2/1995 | Bota et al. ............................. | 477/143 |
| 5,401,219 | 3/1995 | Kimura et al. ....................... | 477/148 X |
| 5,468,198 | 11/1995 | Holbrook et al. .................. | 477/149 X |
| 5,669,849 | 9/1997 | Tabata et al. ........................ | 477/154 X |
| 5,707,318 | 1/1998 | Shimei et al. ...................... | 477/149 X |

FOREIGN PATENT DOCUMENTS 5-296332  11/1993  Japan .

*Primary Examiner*—Dirk Wright
*Assistant Examiner*—Peter T. Kwon
*Attorney, Agent, or Firm*—Burns, Doane, Swecker & Mathis, LLP

[57] ABSTRACT

In a shift control apparatus in a vehicle automatic transmission, up-shift is carried out from a low velocity step to a high velocity step. When a rotational blow is generated, a controlling device controls the releasing side element of frictional engaging elements in such a target that the releasing side element of frictional engaging elements slips on the mating member with the engaging side element of frictional engaging elements moving for engagement.

8 Claims, 7 Drawing Sheets

|  |  | CLUTCH | | BRAKE | | | SOLENOID VALVE | | |
| --- | --- | --- | --- | --- | --- | --- | --- | --- | --- |
|  |  | C 1 | C 2 | B 0 | B 1 | B 2 | NO.1 | NO.2 | NO.3 |
| P |  |  |  |  |  |  |  |  |  |
| R |  | ○ |  |  |  |  | × | ○ | × |
|  |  | ○ |  |  |  | ○ | × | × | × |
| N |  | ○ |  |  |  |  |  |  |  |
| D | 1 | ○ |  |  | ○ |  | × | ○ | ○ |
|  | 2 |  | ○ |  | ○ |  | ○ | × | ○ |
|  | 3 | ○ | ○ |  |  |  | × | × | × |
|  | 4 |  | ○ | ○ |  |  | ○ | × | × |

SHIFT CONTROL APPARATUS IN VEHICLE AUTOMATIC TRANSMISSION

BACKGROUND OF THE INVENTION

1. Field of the Invention

The present invention relates to a shift control apparatus in a vehicle automatic transmission.

2. Description of Related Art

Generally, an automatic transmission in a vehicle has a plurality of frictional engaging elements (clutches and brakes). These frictional engaging elements are operated for engagement and for release to shift a speed of vehicle.

For example, when up-shift from a low velocity step to a high velocity step is carried out, frictional engaging elements being engaged in the low velocity step are released, and frictional engaging elements to be engaged to the high velocity step are newly engaged; so, the frictional engaging elements are changed to carry out up-shift.

The former for releasing engagement is a releasing side element of the frictional engaging elements. The latter for engaging newly is an engaging side element of the frictional engaging elements. A timing for changing frictional engaging elements is very important for shifting gears.

Although the engaging side element of frictional engaging elements is sufficiently prepared for engagement, the releasing side element of frictional engaging elements sometimes is early released from a mating member. In such a case, the aforementioned changing motion can't be smoothly carried out. This causes a phenomenon in which the number of revolutions of the engine blows, that is, a rotational blow is generated.

Conventionally, the aforementioned changing motion has been carried out by using one-way clutches.

Further, Japanese Patent Unexamined Publication 5-296, 332 discloses a sift control apparatus in which the one-way clutches are abolished or simplified in view of costs and so on. According to this publication technique, when shift doesn't start in spite of the fact that the predetermined time decided on the basis of operating conditions passes, that is, when the engaging side element of frictional engaging elements is engaged with delays, the controller raises an increasing speed of hydraulic pressure for working the engaging side element of frictional engaging elements. Therefore, the controller engages the engaging side element of frictional engaging elements with the mating member, thereby suppressing the rotational blow.

SUMMARY OF THE INVENTION

The aforementioned publication technique raises the increasing speed of the engaging side element of frictional engaging element so as to suppress the rotational blow.

However, the aforementioned publication technique sometimes has the following problem in response to using conditions.

For example, since operating oil viscosity is excessively large because of low-temperature etc., the engaging hydraulic pressure for moving the engaging side element of frictional engaging elements rises with delays. In such a case, the control concerning the aforementioned publication 5-296,332 technique doesn't work sufficiently, thereby generating the rotational blow sometimes.

The present invention has been developed in view of the aforementioned circumstances. It is an object of the present invention to provide a shift control apparatus in a vehicle automatic transmission which employs not the system in which a releasing side element of frictional engaging elements is immediately released but the system in which a releasing side element of frictional engaging elements is controlled positively to slip on a mating member, and which can advantageously suppress a rotational blow of turbine rotational speed in up-shift.

In the first aspect of the present invention, a shift control apparatus in a vehicle automatic transmission, wherein an engaging side element of frictional engaging elements is engaged to become a high velocity step, while a releasing side element of frictional engaging elements engaged in a high velocity step is released from a mating member, in up-shift, and the apparatus comprises:

a controlling means for controlling the releasing side element of frictional engaging elements in such a target that the releasing side element of frictional engaging elements continues to slip on the mating member with the engaging side element of frictional engaging elements moving for engagement when a rotational blow is generated.

In the second aspect of the present invention, when the engaging side element of frictional engaging elements isn't sufficiently engaged in spite of the fact that the releasing side element of frictional engaging elements slips for more than the predetermined time, the controlling means controls the engaging side element of frictional engaging elements in such a manner that the engaging side element of frictional engaging elements is quickened to move for engagement.

According to the first aspect of the present invention, when up-shift is carried out from the low velocity step to the high velocity step, the engaging side element of frictional engaging elements begins to engage with the mating member to establish the high velocity step. In such, the releasing side element of frictional engaging elements, constituting the low velocity step established already, isn't immediately and perfectly released. The releasing side element of frictional engaging elements continues to slip on the mating member until the engaging side element of frictional engaging elements reaches to a sufficiently engaged condition.

That is to say, in the present invention, the releasing side element of frictional engaging elements isn't released immediately but is kept in a semi-engaged and semi-released condition; so, the releasing side element of frictional engaging elements waits until the engaging side element of frictional engaging elements reaches to a sufficiently engaged condition.

Even when the engaging hydraulic pressure rises with delays because of an increase in viscosity due to low-temperature etc., the up-shift change is smoothly carried out from the releasing side element to the engaging side element.

According to the first aspect of the present invention, in the up-shift, even when the engaging side element of frictional engaging elements moves with delays, the releasing side element of frictional engaging elements continues to slip on the mating member for waiting until the engaging side element of frictional engaging elements engages sufficiently.

Therefore, even when the engaging side element of frictional engaging elements moves with delays, the up-shift is smoothly carried out and a rotational blow in the turbine rotational speed is advantageously suppressed.

Accordingly, even when the hydraulic pressure rises with delays because of an increasing in viscosity due to low-temperature etc., up-shift is smoothly carried out.

Also, even when a clearance-gap is large between the engaging side element of frictional engaging elements and the mating member, namely, even when the engaging side element of frictional engaging elements requires a long time for closing a clearance-gap between the engaging side element and the mating member, an excessive increase in the engaging hydraulic pressure is easy to be avoided in the engaging side element of frictional engaging elements. Thus, shift-shock is suppressed advantageously. On the other hand, in the technique described in the aforementioned publication 5- 296,332 technique, since the engaging hydraulic pressure is easy to become excessive, the shift-shock is easy to generate.

Even when the releasing side element of frictional engaging element slips for more than the predetermined time, the engaging side element of frictional engaging element isn't sufficiently engaged because of delays in the rising of engaging hydraulic pressure. In such a case, according to the second aspect of the present invention, the engaging side element of frictional engaging elements is quickened to move for engagement. Therefore, the engaging side element of frictional engaging elements can speedily be engaged. This can prevent the releasing side element of frictional engaging elements from over-slipping. Further, this can suppress an excessive wear in the releasing of frictional engaging elements to achieve long-life in the releasing side element of frictional engaging elements.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENT

Having generally described the present invention, a further understanding can be obtained by reference to the specific preferred embodiment which are provided herein for purpose of illustration only and are not intended to limit the scope of the appended claims.

A preferred Embodiment of a shifting controller apparatus in a vehicle automatic transmission to the present invention will be hereinafter described with reference to Figures.

(1) basic construction

Figures 1, 2:
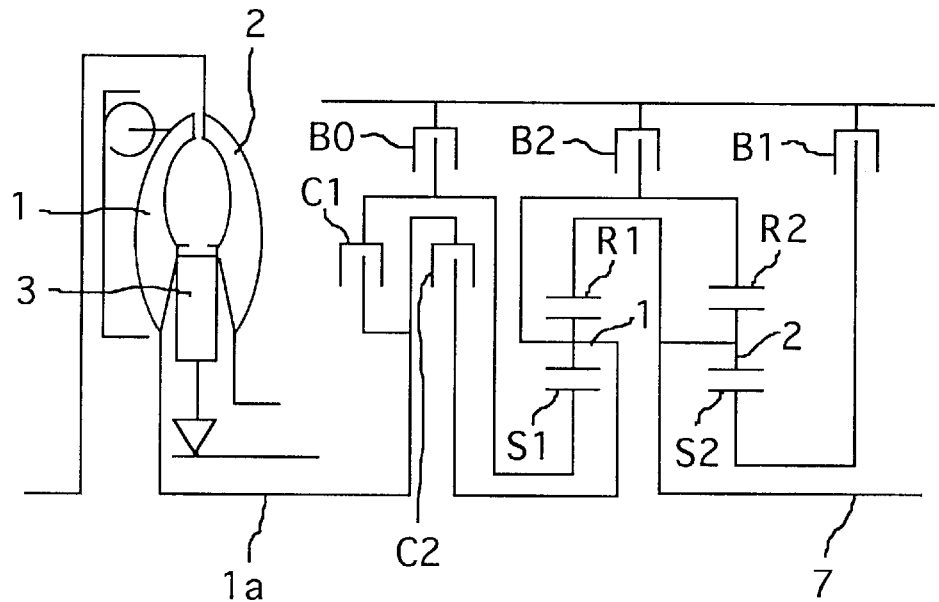
FIG. 1 is a skeleton diagram which shows a shift control apparatus in a vehicle automatic transmission.
FIG. 2 is an operational table of the shift control apparatus in a vehicle automatic transmission.

FIG. 1 shows a skeleton diagram of the shift control apparatus in a vehicle automatic transmission. In FIG. 1, 1 indicates a turbine, 1a indicates a turbine shaft, 2 indicates a pump, 3 indicates a stator. There are clutches C1, C2 working as frictional engaging elements, and brakes B0,B1, B2 working as frictional engaging elements. There are ring-gears R1,R2, sun-gears S1, S2, and carriers E1,E2.

FIG. 2 shows an example of operating table in the aforementioned shifting controller. A "○" mark means that a frictional engaging elements is in an engaged condition, and markless means that the frictional engaging elements is in a released condition. FIG. 2 shows that the clutch C1 is engaged and the brake B1 is engaged in the range D1, the clutch C2 is engaged and the brake B1 is engaged in the range D2, and the clutch C1 is engaged and the clutch C2 is engaged in the range D3.

As appreciated from FIG. 2, when the up-shift is carried out from the range D1 in the low velocity step to the range D2 in the high velocity step, the clutch C1 is released and the clutch C2 is engaged, while the brake B1 is engaged. In such a case, the clutch C1 works as the releasing side element of frictional engaging elements, and the clutch C2 works as the engaging side element of frictional engaging elements.

Further, as appreciated from FIG. 2, when the up-shift is carried out from the range D2 in the low velocity step to the range D3 in the high velocity step, the brake B1 is released and the clutch C1 is engaged, while the clutch C2 is engaged. In such a case, the brake B1 works as the releasing side element of frictional engaging elements, and the clutch C1 works as the engaging side element of frictional engaging elements Still further, as appreciated from FIG. 2, when the up-shift is carried out from the range D3 in the low velocity step to the range D4 in the high velocity step, the clutch C1 is released and the brake B0 is engaged, while the clutch C2 is engaged. In such a case, the clutch C1 works as the releasing side element of frictional engaging elements, and the brake B0 works as the engaging side element of frictional engaging elements.

Figure 3:
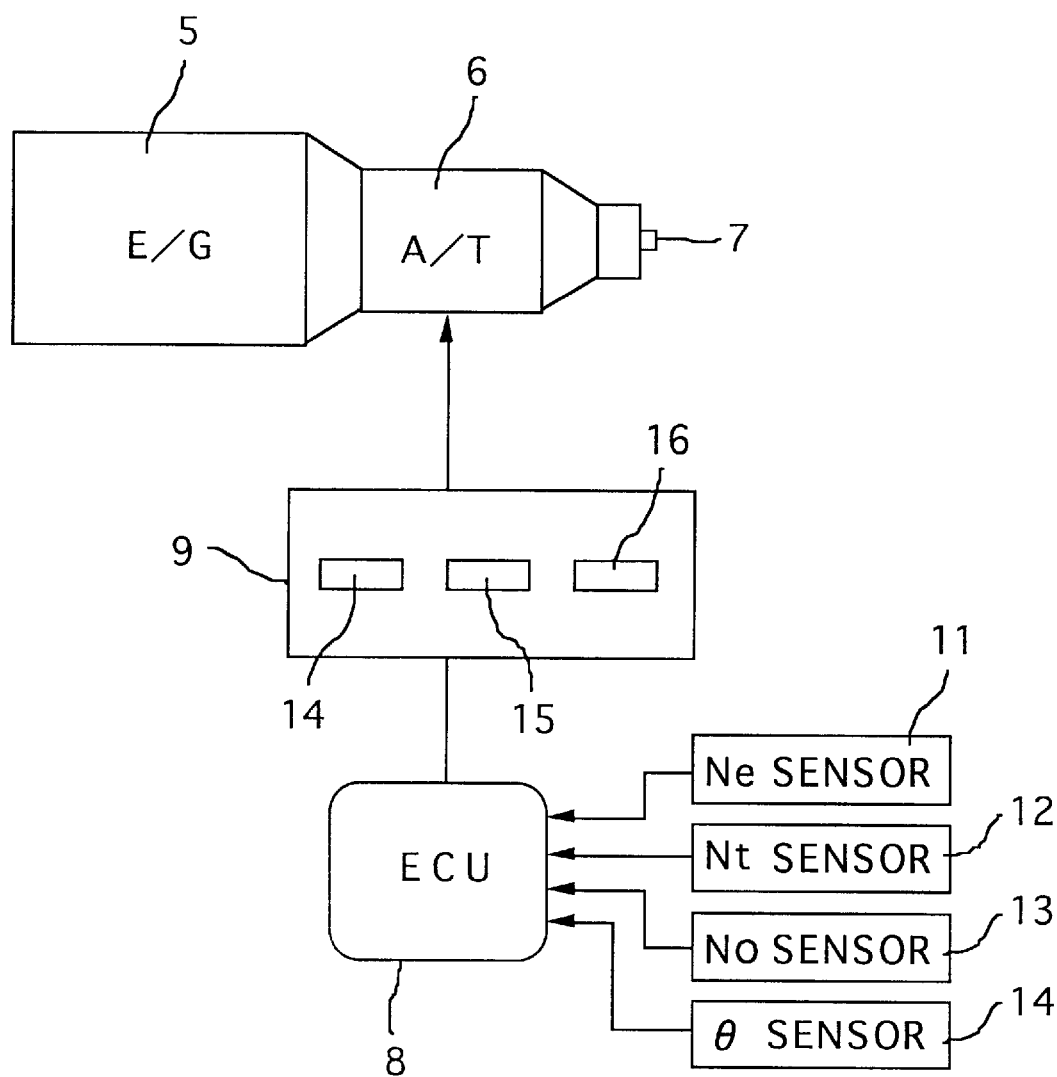
FIG. 3 is a block diagram of the shift control apparatus in the vehicle automatic transmission.

FIG. 3 shows a block diagram of the shifting apparatus and an engine. FIG. 3 shows that a driving force of engine (E/G) is transmitted by way of the shifting apparatus 6. The shifting apparatus 6 is controlled a hydraulic circuit 9 controlled by a controller (ECU) 8. Ne sensor 11 detects a rotational frequency of the engine, Nt sensor 12 detects the rotational frequency of the turbine 1a working as an inputting shaft, No sensor 13 detects a rotational frequency of the outputting shaft 7 working as the driving shaft, and θ sensor 14 detects a throttle degree of a throttle valve. The signals from these sensors are inputted into the controller 8.

In the hydraulic circuit 9, duty-solenoid valves 14 to 16 (referred to as a solenoid valve hereinafter) are disposed.

In releasing the releasing side element of frictional engaging elements, one of the solenoid valves 14 to 16 generates a releasing hydraulic pressure. In engaging the engaging side element of frictional engaging elements, the other of solenoid valves 14 to 16 generates an engaging hydraulic pressure.

In other words, on the basis of signals from the aforementioned sensors, the controller 8 outputs hydraulic command values into the duty-solenoid valves 14 to 16 so as to control each of the valves independently.

Accordingly, the controller 8 controls the clutches C1, C2 and the brakes B0,B1,B2 in the engaging motions and releasing motions. The control will be described hereinafter.

(2) The control mode in a normal situation which doesn't generate a rotational blow.

[1] The up-shift from a low velocity step to a high velocity step

Figure 4:
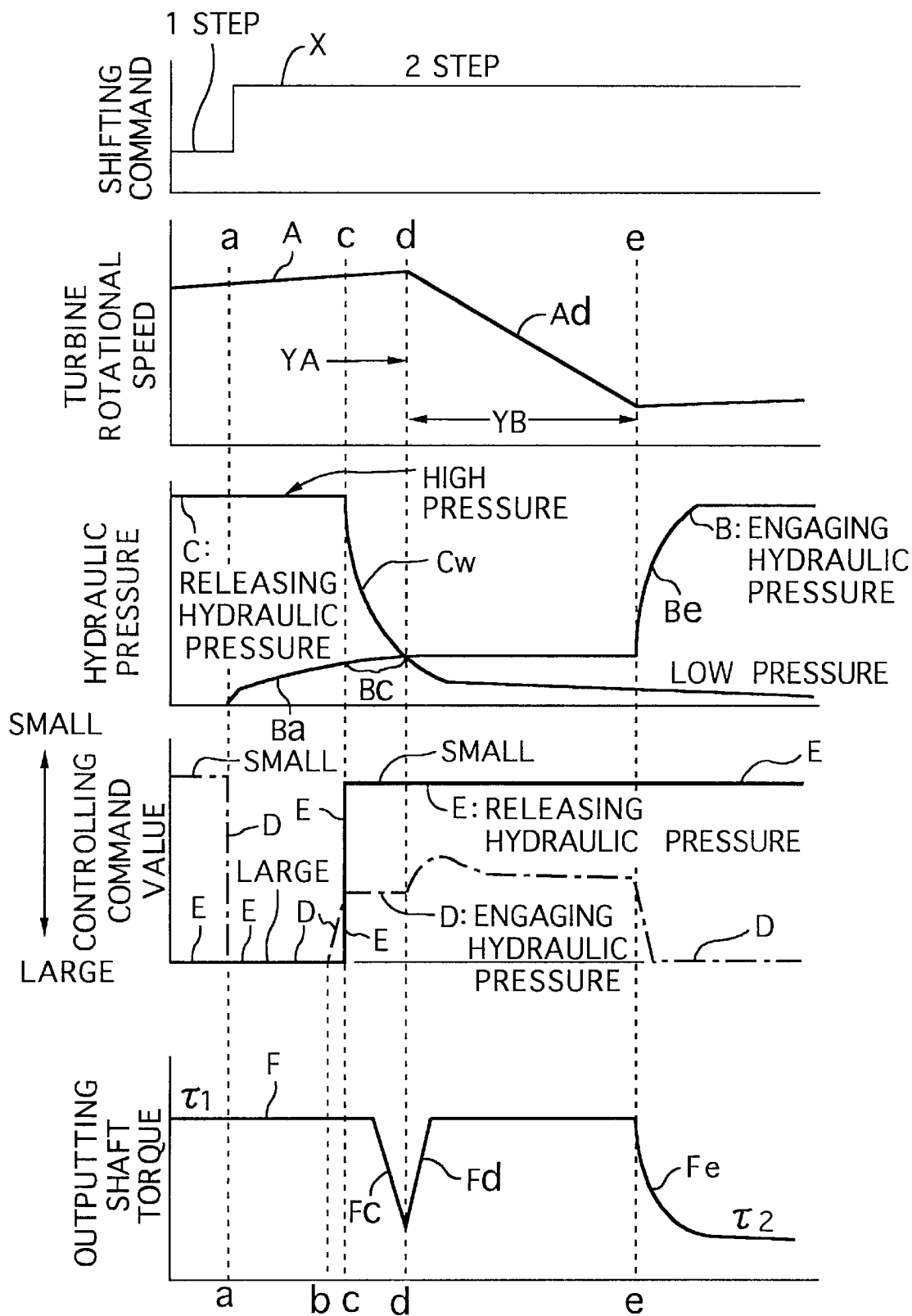
FIG. 4 is a timing chart to carry out up-shift.

FIG. 4 shows schematically timing charts in which the up-shift is carried out from the low velocity step (1 step) to the high velocity step (2 step) with no rotational blow. The horizontal axis of FIG. 4 exhibits time which advances as it approaches rightward. The characteristic line X in FIG. 4 shows a timing chart of shifting command outputted from the controller 8. The characteristic line A in FIG. 4 shows a rotational frequency of the turbine shaft 1a. The characteristic line B in FIG. 4 shows a timing chart of engaging hydraulic pressure in the engaging side element of frictional engaging elements. The characteristic line C in FIG. 4 shows a timing chart of releasing hydraulic pressure in the releasing side element of frictional engaging elements. The characteristic line D described by chain-line in FIG. 4 shows a timing chart of controlling command value (duty ratio) for supplying pressure to the engaging side element solenoid valve for obtaining the engaging hydraulic pressure. The characteristic line E in FIG. 4 shows a timing chart of controlling command value (duty ratio) for supplying pressure to the releasing side element solenoid valve for obtaining the releasing hydraulic pressure. The characteristic line F in FIG. 4 shows a timing chart of outputting shaft torque for meaning torque-fluctuations of the outputting shaft 7.

As shown in the characteristic line F, before the up-shift, the outputting shaft torque exhibits $\tau 1$. After the up-shift, the outputting shaft torque exhibits $\tau 2$, Because the high velocity step can decrease the outputting shaft torque due to a gear ratio than the low velocity step.

According to this control mode, as shown at the characteristic line X, the controller 8 outputs the up-shift command from the low velocity step (1 step) to the high velocity step (2 step). When the up-shift command is outputted, as shown at the characteristic line A in FIG. 4, the turbine rotational speed begins to decrease at Time d, and the turbine rotational speed is kept in a steady state from Time e, at the finishing of up-shift.

Generally, as shown at the characteristic line A in FIG. 4, the turbine rotational speed begins to decrease from Time d. In the region YA till Time d, a torque phase pattern control is carried out. That is to say, in the torque phase control, the controller 8 outputs the controlling command value shown in the characteristic line D with respect to the engaging hydraulic pressure until Time d, and the controller 8 outputs the controlling command value shown at the characteristic line E with respect to the releasing hydraulic pressure until Time d.

The region YB in which a turbine rotational speed decreases gradually from Time d to Time e, is referred to as the inertia phase. An inertia feed-back control is carried out in the region YB. Namely, the controller 8 targets an incline portion Ad from Time d to Time e of the characteristic line A in FIG. 4. Also, the controller 8 corrects the turbine rotational speed by means of feed-back control in such a target that the turbine rotational speed adapts to the target Ad in FIG. 4, while inputting the detected signals from the sensors. As a result, the controller 8 outputs the controlling command values of engaging hydraulic pressure shown at the characteristic line D provided from Time d to Time e, and the controlling command values of releasing hydraulic pressure shown at the characteristic line E provided from Time d to Time e.

In the present embodiment, as mentioned above, at Time a, the controller 8 outputs the shifting command for the up-shift. Accordingly, as shown at Ba of the characteristic line B in FIG. 4, the engaging hydraulic pressure increases gradually from Time a to Time c.

That is, although the controlling command value of the engaging hydraulic pressure is set at "small" before Time a, the controlling command value of the engaging hydraulic pressure is set at "large" between Time a to and Time b.

Accordingly, the engaging hydraulic pressure increases at the maximum speed to avoid delays in the up-shift.

In this case, the releasing hydraulic pressure is kept in "high pressure" between Time a and Time c; thus; so, at Time c, the releasing side element of frictional engaging elements isn't released but is engaged with the mating member.

From just before that the engaging side element of the frictional engaging elements begins to engage, that is, from the vicinity of Time c shown in FIG. 4, the releasing hydraulic pressure decreases sharply at the maximum speed, as shown as Cw in the characteristic line C in FIG. 4; the releasing side element of frictional engaging elements sharply moves to release.

Concretely, as shown at the characteristic line E in FIG. 4, from Time c, the controlling command value is sharply set at "small" in the releasing hydraulic pressure. As appreciated at the characteristic line E in FIG. 4, also in the range of after Time c, the command value is set at "small" in the releasing hydraulic pressure; thus, the releasing side element continues to be released.

Further, from just before that the engaging side element of frictional engaging elements begins to be engaged, namely from Time c, as shown as Bc of the characteristic line B in FIG. 4, the increasing speed slows down in the engaging hydraulic pressure. Therefore, the engaging side element of frictional engaging elements is engaged generously; so, shifting shock is reduced, and the up-shift is generously carried out.

In other words, the controller 8 in the present embodiment has a controlling means for slowing down the increasing speed in the hydraulic pressure of the engaging side element of frictional engaging elements before the beginning of the engagement of engaging side element in order to reduce shifting shock.

When a slip is detected in the releasing side element of the frictional engaging elements at Time d in FIG. 4, the inertia feed-back control is carried out. That is to say, the controller 8 controls the engaging hydraulic pressure and the releasing hydraulic pressure in such a target that a decreasing change rate in the turbine rotational speed becomes the predetermined value, that is, in such a target that an inclinded portion Ad of the characteristic line A in FIG. 4 between Time d and Time e becomes the predetermined value.

Going toward Time e in FIG. 4 implies that the engaging side element of frictional engaging elements progresses for engagement. At Time e in FIG. 4, the decrease of turbine rotational speed ends; thus, the engagement of engaging side element of frictional engaging elements is detected.

After that, as shown at Be of the characteristic line B in FIG. 4, the engaging hydraulic pressure is sharply increased to engage the engaging side element of frictional engaging elements with the mating member sufficiently. When the up-shift is finished in such a way, the outputting shaft torque is in a steady condition with it decreased to $\tau 2$ as shown at Fe of the characteristic line F in FIG. 4.

Fc of the characteristic line F in FIG. 4, having a dowturn slope, means that the outputting shaft torque decreases because of the release of the releasing side element of frictional engaging elements. Fd of the characteristic line F in FIG. 4, having an upturn slope, means that the outputting shaft torque increases because of the engagement of the engaging side element of frictional engaging elements.

The aforementioned FIG. 4 shows the control mode in which a rotational blow isn't generated. However, in the actual operation, in response to using conditions, for example, the engaging hydraulic pressure sometimes rises with delays because of the excessive viscosity in operating oil. In such a case, the engaging side element of frictional engaging elements is engaged with delays; so, there might be raised the problem that a rotational bow is sometimes generated in the turbine rotational speed.

The following is about the control mode with respect to the case where a rotational blow is generated.

(3) the control mode with respect to the case where a rotational blow is generated in the up-shift.

Figure 5:
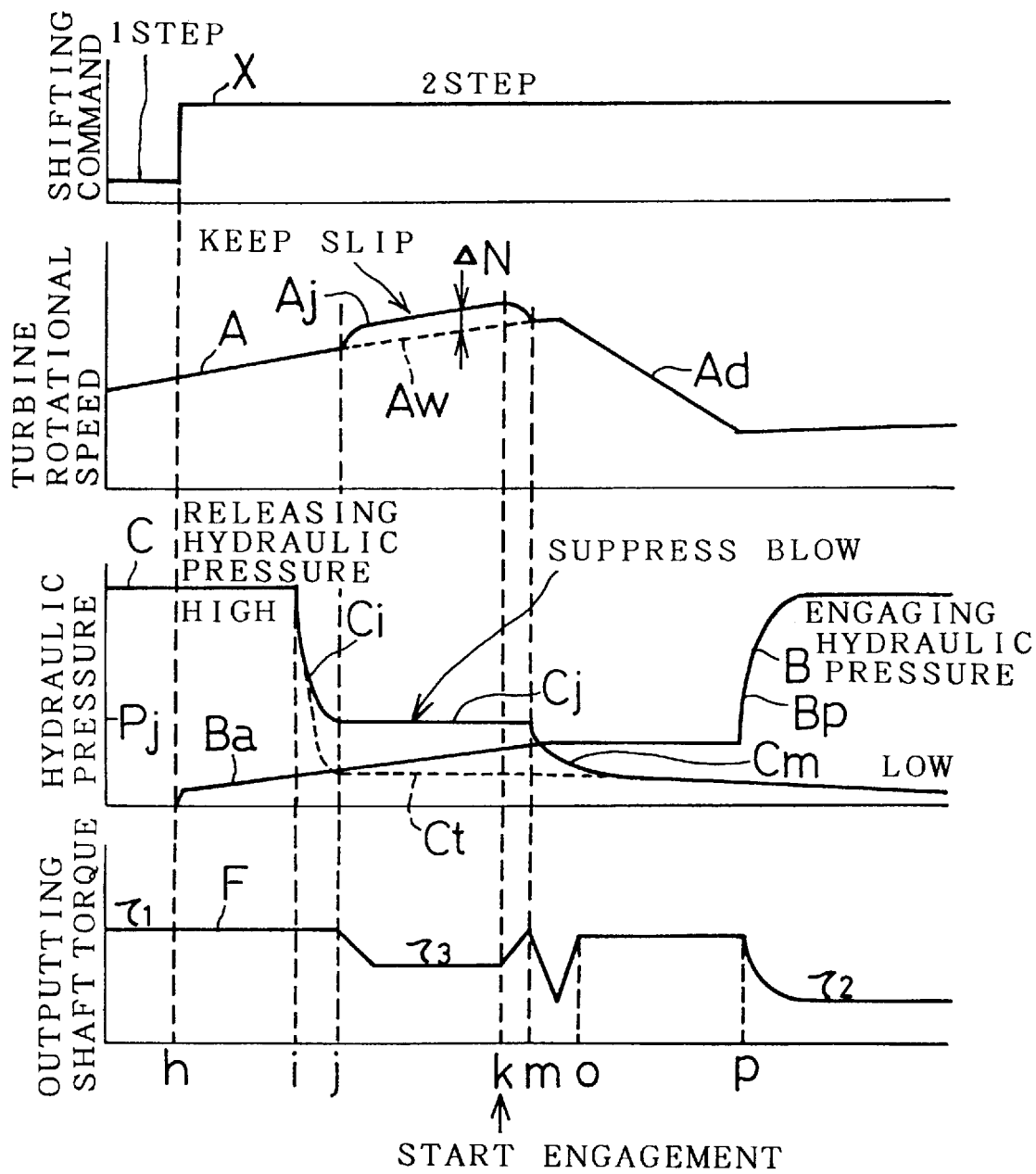
FIG. 5 is a timing chart to carry out up- shift with a rotational blow.

The timing chart shown in FIG. 5 approximates to the timing chart shown in FIG. 4. However, it is different in the control portion with respect to the rotational blow.

The characteristic line X in FIG. 5 shows a timing chart of shifting command value of the controller 8. The characteristic line A in FIG. 5 shows a timing chart of turbine rotational speed. The characteristic line B in FIG. 5 shows a timing chart of engaging hydraulic pressure. The characteristic line C in FIG. 5 shows a timing chart of releasing hydraulic pressure. The characteristic line F in FIG. 5 shows a timing chart of outputting shaft torque.

According to the present embodiment, the controller 8 outputs the up-shift command from the low velocity (1 step) to the high velocity step (2 step). As shown at Ba of the characteristic line B in FIG. 5, the engaging hydraulic pressure increases gradually from Time h to Time m. The incline of Ba of the characteristic line B in FIG. 5 is fundamentally constant. Thus, an increasing rate is fundamentally constant in the engaging hydraulic pressure of the engaging side element of frictional engaging elements.

As shown in the characteristic line C in FIG. 5, the releasing hydraulic pressure is kept at high pressure till Time i. That is, the releasing side element of frictional engaging elements isn't released yet to be engaged with the mating member.

As mentioned above, from just before that the engaging side element of frictional engaging elements is engaged with the mating member, that is, from Time i in FIG. 5, the releasing hydraulic pressure of the releasing side element of frictional engaging elements is sharply decreased at the maximum speed as shown Ci of the characteristic line C in FIG. 5. This approximates the controls mode concerning FIG. 4.

The turbine rotational speed sometimes rises because of something as shown at Aj in the characteristic line A in FIG. 5 to generate a rotational blow. When the rotational blow is detected at Time j in FIG. 5, the rotational blow preventing control is carried out as follows:

In the rotational blow preventing control, as shown at Ba in the characteristic line B in FIG. 5, the engaging hydraulic pressure increases at the predetermined incline between Time j and Time m, like the control mode shown in FIG. 4.

Figure 6:
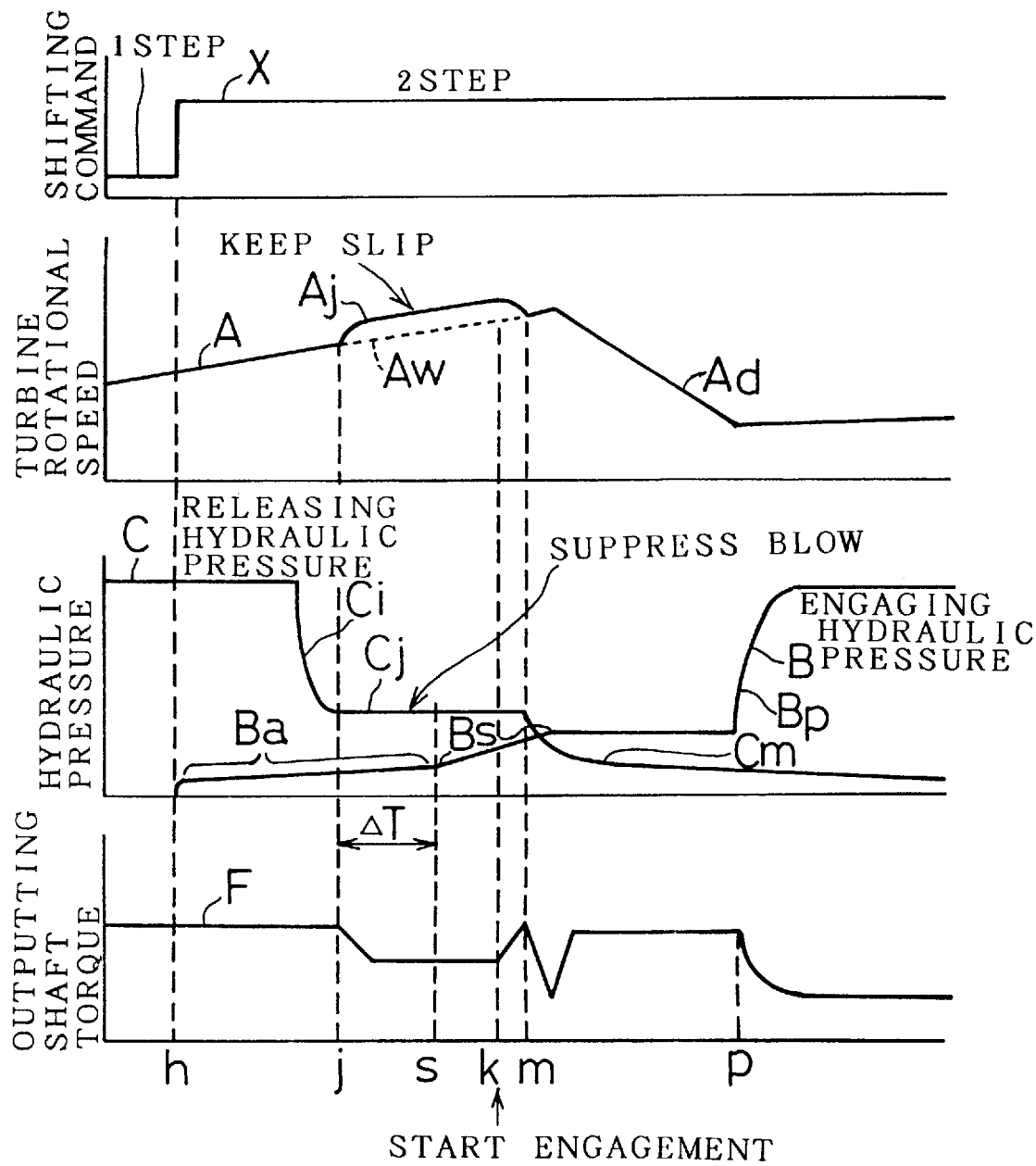
FIG. 6 is a timing chart concerning another embodiment to carry out up-shift with a rotational blow.

A broken line portion Aw of the characteristic line A in FIG. 6 implies the assumed property with respect to the turbine rotational speed on the basis of the assumption that the shift remains in the low velocity step (for example 1 step) being before up-shift operation.

In the present embodiment, if the rotational blow is generated, the controller 8 corrects the turbine rotational speed by feed-back control in such a target that an actual turbine rotational speed is essentially parallel with the broken line portion Aw of the characteristic line A in FIG. 5; thus, the controller 8 suppresses the rotational blow in the turbine rotational speed from enlarging.

Therefore, the releasing side element of frictional engaging elements continues to slip on the mating member. As appreciated from the characteristic line A in FIG. 5, although the rotational blow is generated once, a blowing-amount $\Delta N$ is suppressed not to increase more. In the present embodiment, so to speak, the releasing side element of frictional engaging elements is kept in a semi-engaged and semi-released condition.

In other words, in the present embodiment, if a rotational blow isn't generated, the releasing hydraulic pressure decreases sharply as shown at the broken line Ct in FIG. 5; if a rotational blow is generated, the releasing hydraulic pressure is set approximately at a hydraulic pressure value Pj as exhibited at Cj of the characteristic line C between Time j and Time m in FIG. 5.

That is to say, in the present embodiment, until the engaging side element of frictional engaging elements reaches a condition to be sufficiently engaged with the mating member, the releasing side element of frictional engaging elements continues to slip so as to be kept in a semi-engaged and semi-released condition.

Since the engaging hydraulic pressure increases gradually with the passage of time, the engaging side element of frictional engaging elements begins gradually to be engaged with the mating member. In such a way, the engaging side element of frictional engaging elements is sufficiently engaged, the releasing side element of frictional engaging elements can be completely released. Therefore, as shown at Cm of the characteristic line C in FIG. 5, from Time m at which the engagement of engaging side element is finished, the releasing hydraulic pressure is released again.

Namely, in the present embodiment, if the engaging side element of frictional engaging elements moves for engagement with delays because of something, until the releasing side element of frictional engaging elements reaches the sufficient engaging conditions, the releasing side element of frictional engaging elements waits in a semi-engaged and semi-released condition. Thus, if a rotational blow is generated, it is suppressed that the rotational blow is larger.

In the present embodiment, the engagement is finished at Time m. From Time p being after Time m, as shown at Bp in the characteristic line B in FIG. 5, the engaging hydraulic pressure increases sharply to keep securely the engagement of engaging side element of frictional engaging elements.

In the present embodiment, since the releasing hydraulic pressure is set at Pj, the outputting shaft torque is substantially kept at $\tau 3$ between Time j and Time k of the characteristic line F in FIG. 5 to suppress the decrease of outputting shaft torque.

(4) The other control mode with respect to the case where a rotational blow is generated in the up-shift.

According to the aforementioned embodiment, if the slipping time is excessively long in the region shown at Cj of the characteristic line C in FIG. 5, the releasing side element of frictional engaging element slips for a long time to be kept in a semi-engaged and semi-released condition for a long time. In such a case, a frictional engaging surface of frictional engaging elements increases in wear. This is disadvantageous in long-life of frictional engaging elements.

If a rotational blow continues over the predetermined time $\Delta T$ (properly selectable: for example 0.1 second) from Time j, from the beginning of a rotational blow, that is to say, if the engaging side element of frictional engaging elements isn't sufficiently engaged in spite of after the predetermined time ΔT shown in FIG. 6, the engaging hydraulic pressure is increased from Time s, from the finishing of ΔT, as shown at Bs of the characteristic line B in FIG. 6.

As a result, the engaging side element of frictional engaging elements is quickened to move, it is speedily engaged with the mating member. This can advantageously reduce the excessive wear in the releasing side element of frictional engaging elements to realize long-life of the releasing side element of frictional engaging elements.

(flow charts)

Figure 7:
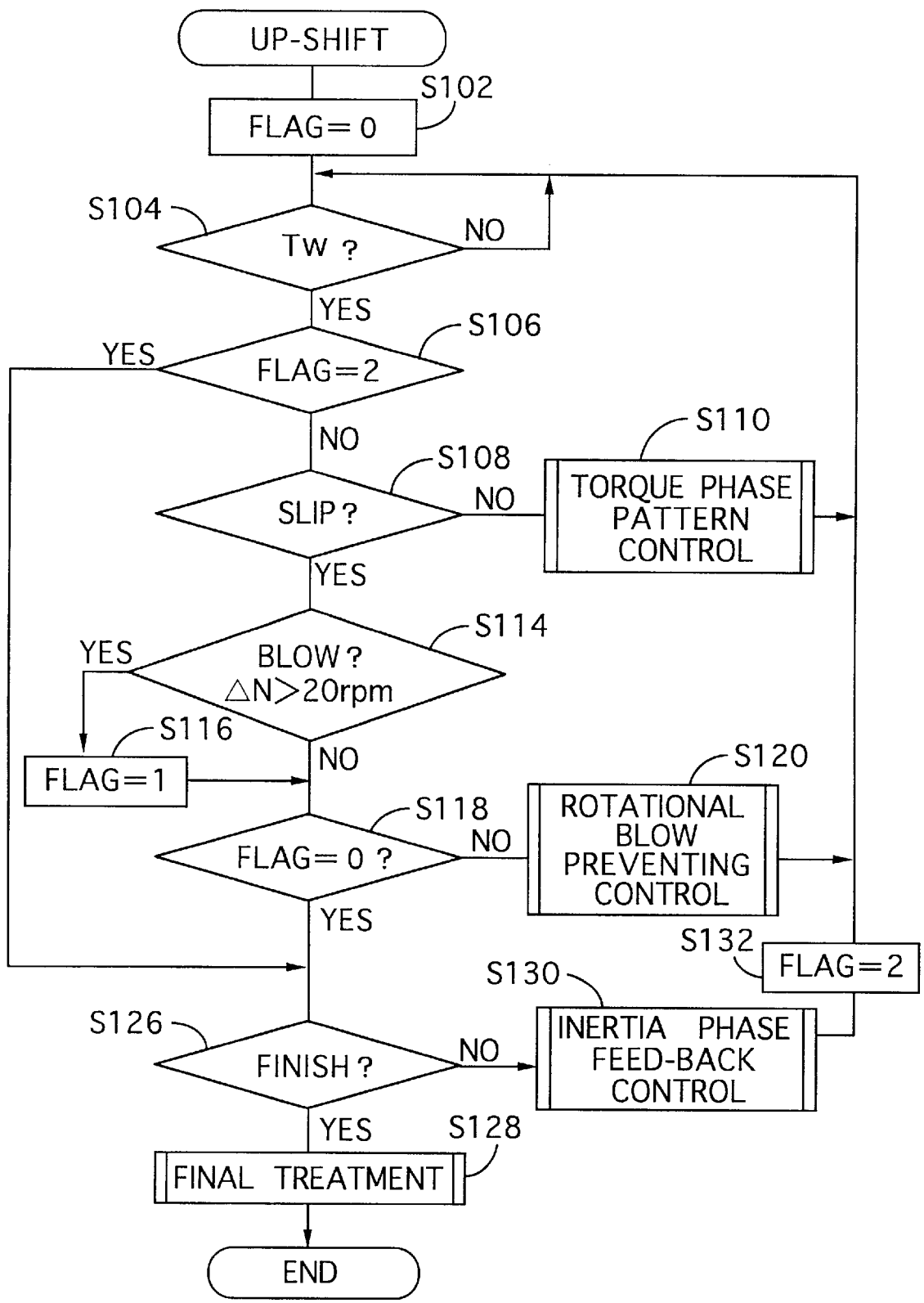
FIG. 7 is a flow chart of up-shift control.

FIG. 7 shows a flow chart illustrating the control mode described in FIG. 6. In this control mode. Nt exhibits an actual turbine rotational speed detected by the Nt sensor 12. An actual rotational speed is detected with respect to the outputting shaft 7 corresponding to the driving shaft. Nt', implying the turbine rotational speed with the shift remaining before up-shift, exhibits the turbine rotational calculated speed in which the actual rotational speed of the outputting shaft 7 is multiplied by the reducing ratio in the low velocity step, namely, by the reducing ratio before the up-shift.

An amount of rotational blow in turbine rotational speed is defined as ΔN.

$$\Delta N = (Nt - Nt')$$

In the present embodiment, in the case of ΔN>20 rpm, the controller judges that a rotational blow is generated in the turbine rotational speed.

In this control mode, selection of the treatment is on the basis of the judging flag. When the judging flag is "0", the turbine rotational speed is in the torque phase and the normal control is carried out. When the flag is "1", a rotational blow is generated and the rotational blow preventing control is carried out. When the judging flag is 2, the turbine rotational speed is in the inertia phase and the inertia feed-back control is carried out.

Firstly, in step S102, the controller set the judging flag to "0" for carrying out the up-shift control. In step S104, the controller judges whether the predetermined time Tw (for example 10 m seconds) passes or not. The controller waits till the predetermined time Tw passes.

In step S106, the controller 8 judges whether the judging flag is "2" or not. Since the judging flag is previously set at "0", the controller 8 selects "NO", progresses from step S106 to step S108, and judges whether a slip is detected in the releasing side element of frictional engaging elements or not. The controller 8 judges this slip on the basis of a change of turbine rotational speed. If the slip isn't detected, the controller 8 carries out the torque phase pattern control to returns to step S104.

In step S108, if the slip is detected in the releasing side element of frictional engaging elements, the controller progresses to step S114 to judge whether a rotational blow is generated or not. Concretely, in the case of ΔN>+20 rpm, the controller judges that a rotational blow is generated. When the rotational blow is generated, the controller sets the judging flag at "1" in step S116, the controller progresses to step S120 by way of step S118, the controller carries out the rotational blow preventing sub-routine, and it returns to step S104.

In step S114, if the controller judges that the rotational blow isn't generated, the controller progresses to step S118 to judge whether the judging flag is "0" or not. When the flag is "0", the controller progresses to step S126 to judge whether the up-shift is finished or not. The finish of up-shift is judged on the basis of a change of outputting shaft torque, Not finishing the up-shift means that engagement doesn't reach Time p in FIG. 5, the finishing of up-shift; so, the turbine rotational speed is in the inertia phase. Thus, the controller progresses to step S130 to carry out the inertia feed-back control. That is to say, the controller controls the releasing hydraulic pressure and the engaging hydraulic pressure in such a target that these pressure are aimed at Ad of the characteristic line A. Further, the controller progresses from step S130 to step S132, it sets the judging flag to "2", and it returns to step S104.

If the up-shift is finished, the controller progresses from step S126 to step S128, it carried out a final treatment and a reset of the judging flag to finish the up-shift control.

Figure 8:
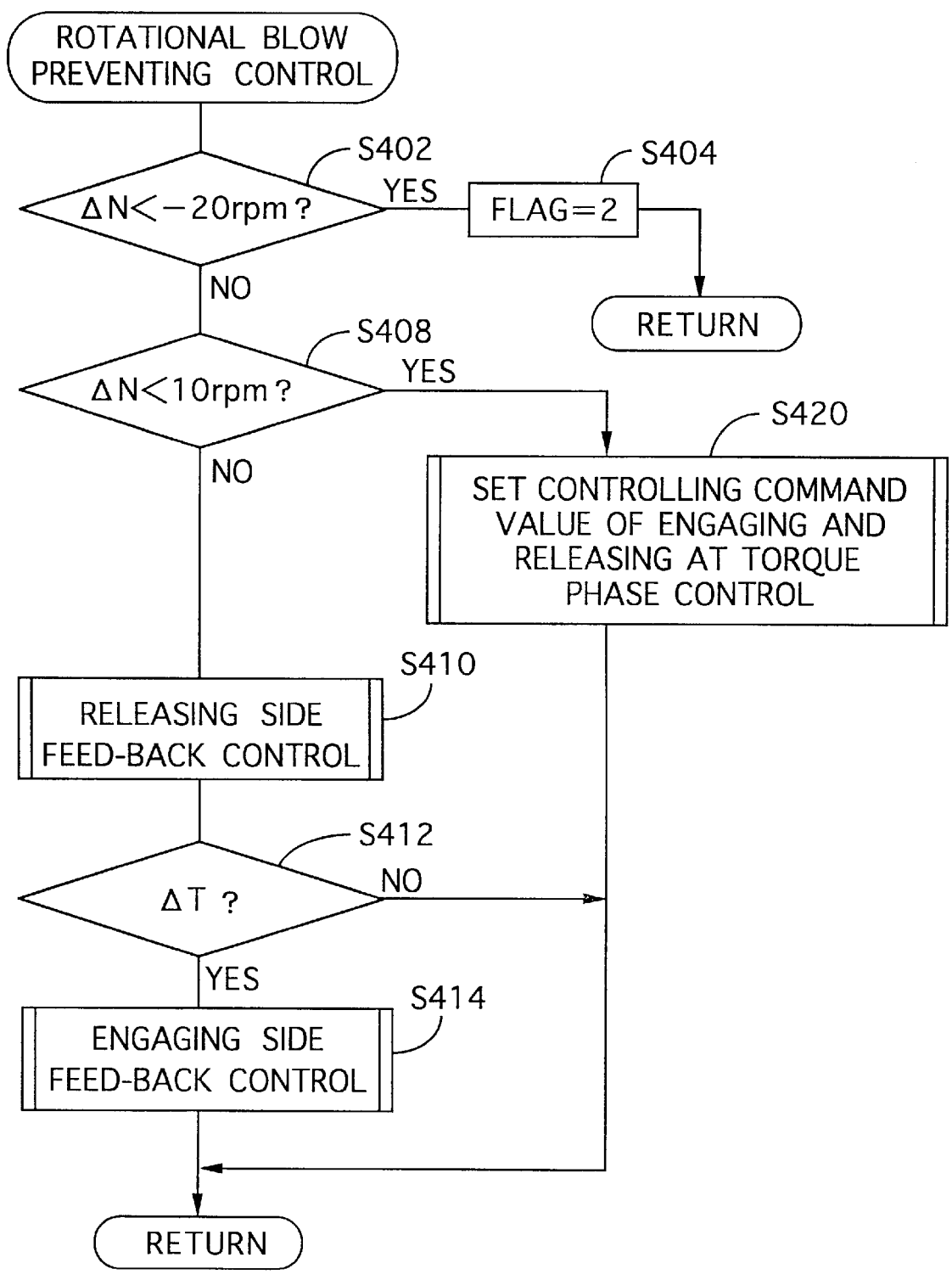
FIG. 8 is a flow chart of rotational blow suppressing control.

FIG. 8 shows a flow chart of the rotational blow preventing control sub-routine (step 120). In step S402, the controller judges whether (ΔN<-20 rpm) is realized or not. If "YES", the controller judges that turbine rotational speed is in the inertia phase. Thus, the controller sets the judging flag to "2" in step S404 so as not to carry out the rotational blow preventing control but to carry out the inertia feed back-control, and it returns to the main routine.

If (ΔN<-20 rpm) isn't realized, the controller progresses to step S408 to judge whether (ΔN<+10 rpm) is realized or not. If "NO", the controller progresses to step S410 so as to carry out the releasing side feed-back control.

Namely, the controller controls the releasing hydraulic pressure in such a target that the releasing hydraulic pressure adapts to Cj of the characteristic line C in FIG. 5 and in such a target that the releasing side element of frictional engaging elements slips on the mating member.

Further, in step S412, the controller judges whether the rotational blow continues over the predetermined time or not, that is, whether the predetermined time ΔT shown in FIG. 6 passes or not. If "NO", the controller returns to the main routine. If "YES", the controller progresses from S412 to S414 to carry out the engaging side of feed-back control so as to enlarge the increasing speed in the engaging hydraulic pressure as shown Bs of the characteristic line B shown in FIG. 6.

When the judgement in step S408 is "YES", the controller judges that the rotational blow is suppressed, it progresses to step S420. As a result, the controller sets the controlling command value of releasing hydraulic pressure and the controlling command value of engaging hydraulic pressure at the value of the torque phase control. Thus, the controller waits for the inertia phase to begin, and it returns to the main routine.

According to the releasing side feed-back control, the controlling command value U1(k), being about the releasing hydraulic pressure, exhibits a function including time-factor. The controlling command value U1(k) is decided as follows:

$$U1(k) = U1(k-1) + Ki \cdot e(k) + Kp \cdot [e(k) - e(k-1)]$$

where each of Ki and Kp is a constant. e(k) is decide as follows:

$$e(k) = Nt'(k) - Nt'(k-1) - Nt(k) + Nt(k-1)$$

where e(k) includes the turbine rotational speed Nt, and the turbine rotational calculated speed Nt' as factors.

The controller controls an actual turbine rotational speed in such a target that a change rate in an actual turbine rotational speed Nt adapts to a change rate in the turbine rotational calculated speed Nt'. Here, the change rate in Nt' is exhibited as Aw of the characteristic line A shown in FIG. 6. Also, as mentioned above, the turbine rotational calculated speed Nt' is corresponding to the speed which is calculated on the basis of the actual rotational speed of outputting shaft 7 in the assumption that the shift remains in the low velocity step being before the up-shift.

That is to say, in the present embodiment, as appreciated from the characteristic line A shown in FIG. 6, an actual turbine rotational speed is controlled to be substantially parallel with the turbine rotational speed which is shown at Aw in FIG. 6 and which is in the assumption the shift remains in the low velocity step.

According to the engaging side feed-back control, the controlling command value U2(k) is decided as follows:

$$U2(k)=U2(k-1)+Ki\cdot e(k)+Kp\cdot[e(k)-e(k-1)]$$

What is claims is:

1. A shift control apparatus in a vehicle automatic transmission, wherein an engaging side element of frictional engaging elements is engaged to become a high velocity step, while a releasing side element of frictional engaging elements engaged in a low velocity step is released from a mating member, during up-shift, and said apparatus comprising:

controlling means for controlling said releasing side element of frictional engaging elements in such a target that said releasing side element of frictional engaging elements continues to slip on said mating member with said engaging side element of frictional engaging elements moving for engagement when a rotational blow is generated;

said engaging side element of frictional engaging elements having a condition to be engaged;

until said engaging side element of frictional engaging elements reaches said condition to be engaged, said releasing side element of frictional engaging elements continues to slip so as to be kept in a semi-engaged and semi-released condition with respect to said mating member of said releasing side element.

2. A shift control apparatus in a vehicle automatic transmission according to claim 1, wherein said engaging side element of frictional engaging elements moves in an engaging direction by an engaging hydraulic pressure and said releasing side element of frictional engaging elements moves in a releasing direction by a releasing hydraulic pressure;

just immediately before said engaging side element of frictional engaging elements begins to engage with the mating member, said controlling means controls said engaging hydraulic pressure in such a manner that an increasing speed of said engaging hydraulic pressure slows down.

3. A shift control apparatus in a vehicle automatic transmission according to claim 1, wherein said controlling means has a target with respect to a turbine rotational speed, said target is the turbine rotational speed decided on the basis of the assumption that the shift remains in said low velocity step regardless of said up-shift;

when said rotational blow is generated, said controlling means corrects the turbine rotational speed by feed-back control in such a manner that an actual turbine rotational speed is essentially parallel with said target so as to slip said releasing side element of frictional engaging elements on said mating member and so as to suppress said rotational blow in said turbine rotational speed.

4. A shift control apparatus in a vehicle automatic transmission according to claim 1, wherein said engaging side element of frictional engaging elements moves in an engaging direction by an engaging hydraulic pressure and said releasing side element of frictional engaging elements moves in a releasing direction by a releasing hydraulic pressure;

when said rotational blow is generated;

said controlling means controls said releasing hydraulic pressure in such a manner that a characteristic line of said releasing hydraulic pressure becomes substantially flat at a middle hydraulic pressure disposed between a high hydraulic pressure and a low hydraulic pressure with the passage of time so as to suppress said rotational blow in said turbine rotational speed.

5. A shift control apparatus in a vehicle automatic transmission according to claim 1, wherein when said engaging side element of frictional engaging elements isn't sufficiently engaged in spite of said releasing side element of frictional engaging element slipping for more than a predetermined time, said controlling means controls the engaging side element of frictional engaging elements in such a manner that the engaging side element of frictional engaging elements is quickened to move for engagement.

6. A shift control apparatus in a vehicle automatic transmission according to claim 5, when said rotational blow continues over the predetermined time from the beginning of said rotational blow, said engaging hydraulic pressure is increased from the finishing of the predetermined time.

7. A shift control apparatus for up-shifting a vehicle automatic transmission comprising:

an engaging side element of frictional engaging elements to be engaged with a high velocity step;

a releasing side element of frictional engaging elements to be engaged with a low velocity step;

first controlling means for controlling said releasing side element to prevent rotational blow from being generated; and second controlling means for engaging said engaging side element.

8. A shift control apparatus according to claim 7, wherein said second controlling means accelerates engagement of said engaging side element when said rotational blow continues over the predetermined time.

* * * * *